(12) United States Patent
LeRow et al.

(10) Patent No.: US 6,222,349 B1
(45) Date of Patent: Apr. 24, 2001

(54) TEMPERATURE FEEDBACK CONTROL OF ALTERNATOR OUTPUT POWER

(75) Inventors: Kevin E. LeRow, Lowell, MA (US); Kevin J. Donegan, Saratoga Springs, NY (US); Mary Tolikas, Nahaut; David Eisenhaure, Cohasset, both of MA (US)

(73) Assignee: SatCon Technology Corporation, Cambridge, MA (US)

( * ) Notice: Subject to any disclaimer, the term of this patent is extended or adjusted under 35 U.S.C. 154(b) by 0 days.

(21) Appl. No.: 09/309,451

(22) Filed: May 11, 1999

Related U.S. Application Data
(60) Provisional application No. 60/084,971, filed on May 11, 1998.

(51) Int. Cl.[7] .................................................... H02J 7/14
(52) U.S. Cl. ................................................ 322/34; 322/33
(58) Field of Search .................................. 322/28, 33, 34

(56) References Cited

U.S. PATENT DOCUMENTS

| | | | |
|---|---|---|---|
| 3,599,079 | 8/1971 | Ansbro et al. | 322/23 |
| 4,470,003 | 9/1984 | Mitchell | 322/23 |
| 4,760,323 | 7/1988 | Naoi | 322/33 |
| 4,890,050 | 12/1989 | Mackevich | 322/34 |
| 4,937,514 | 6/1990 | Iwatani | 322/33 |
| 4,992,722 | 2/1991 | Maruyama et al. | 322/33 |
| 5,198,744 | 3/1993 | Kohl et al. | 322/33 |
| 5,241,261 | * 8/1993 | Edwards et al. | 323/313 |
| 5,266,882 | 11/1993 | Morishita | 322/28 |
| 5,280,231 | * 1/1994 | Kato et al. | 320/31 |
| 5,374,886 | * 12/1994 | Kohl et al. | 322/28 |
| 5,548,202 | 8/1996 | Schramm et al. | 322/33 |
| 5,637,985 | * 6/1997 | Kakizaki et al. | 322/28 |
| 5,925,939 | * 7/1999 | Iwatani et al. | 307/10.1 |
| 6,018,234 | * 1/2000 | De Savasse | 322/33 |
| 6,043,632 | * 4/2000 | Machara et al. | 322/28 |

FOREIGN PATENT DOCUMENTS 2 008 269    2/1971   (DE).

\* cited by examiner

*Primary Examiner*—Nicholas Ponomarenko
(74) *Attorney, Agent, or Firm*—Dike, Bronstein, Roberts & Cushman, LLP; George W. Neuner

(57) ABSTRACT

A charging system including an alternator, and a controller for controlling the output of the alternator to provide a required output to be in tolerance with a measured load, the controller having at least one temperature sensor, and a temperature control device, wherein the temperature control device calculates the slope of temperature variance over time and, in a state of overtemperature, decreases the value provided to the controller representing the required output.

6 Claims, 6 Drawing Sheets

TEMPERATURE FEEDBACK CONTROL OF ALTERNATOR OUTPUT POWER

This application claims benefit to Provisional Application No. 60/084,971 filed May 11, 1998.

BACKGROUND OF THE INVENTION

1. Field of the Invention The present invention relates generally to vehicle charging systems, and more specifically to controlling the output of an alternator using alternator temperature feedback.

2. Background

A typical prior art charging circuit 10 is depicted in FIG. 1. The charging system provides electrical energy while the engine is running to recharge the battery and to power electrical devices. As seen in FIG. 1, a battery 12 is connected between a ground 14 and a positive or "hot" lead 16, which leads to the electrical systems (not shown) of the vehicle and to the alternator 18. This lead 16 is a path for current out of the battery during undercharging or discharging, and a path for current into the battery during charging. The alternator 18 is typically driven by a pulley 20, which is driven by a belt (not shown) from the prime mover or engine (not shown). The electrical systems of the vehicle are powered through lead 22. An ignition switch 24 is also connected to the hot lead 16. Typically, an indicator lamp 26 is present to indicate a discharge state. A voltage regulator input lead 28 connects to the voltage regulator 30, which determines the output of the alternator by controlling the excitation voltage provided to the field winding of the alternator via line 32, as will be discussed in greater detail below.

The basic layout of a vehicle alternator is well known. An alternator is typically a three-phase AC generator that typically comprises a rotor, which is essentially a spinning magnetic field which is turned by the vehicle's engine, and a stator, which is a stationary output winding. The operation is based on Faraday's law of electromagnetic induction. As the rotor is moved creating a varying magnetic field, electromotive force, or EMF, is induced in the windings resulting in current output. In order to produce a magnetic field in the rotor, field windings in the rotor are connected to a source of excitation current. The output from each of the three phases is AC, which is then rectified into DC through a rectifier bridge.

One major byproduct of electrical generation is heat. As the output power of the alternator increases, which typically increases with load, the heat generated by the alternator increases. If the alternator is placed in a condition of excessive loading with insufficient ventilation, permanent damage can occur to the alternator components, especially the electronics and the diodes or rectifier elements. The risk is especially great at vehicle idle speed, when the rotation speed of the alternator governs both its ability to efficiently generate adequate power, and ventilation is at a minimum. Many modern driving environments involving long idle periods in traffic, and the increasing number of electrically powered convenience accessories in vehicles place exceptional demands on the alternator.

Before going into further detail about the temperature effects on the alternator, a discussion of the charging system will be presented.

A prior art rectifier bridge is depicted in FIG. 2. Prior art rectifier bridges for vehicular alternators have typically used an arrangement of diodes D1–D6, which serve as electrical check valves. Each of the three phases V1–V3 is connected to two diodes, such that the negative and positive AC output of each phase are each rectified into DC voltage. FIG. 3 depicts the output that results from the prior art diode bridge, as is well known to those skilled in the art.

The prior art rectifier bridge is very dependable and has been used successfully in claw pole, synchronous (Lundell) alternators in vehicles for decades. However, as discussed above, the modern era has placed increasing power demands on vehicle electrical systems through the constant addition of new electrical and electronic accessories, control systems, etc. to the vehicle. It has also become increasingly less desirable to solve these power requirement problems through increasing the size of the alternator, as available space in the hood of the modern vehicle is densely packed. Further, the additional engine power required to turn a larger alternator decreases overall efficiency of the vehicle, as does the additional weight.

A result of the increasing demands placed on the alternator is that often when the engine is at an idle, when alternator speed and hence power output efficiency are quite low, a deficit in the charging system results. In such situations, the battery supplies the required energy in a discharging state. Repetitive charging and discharging of batteries used in vehicles, typically lead-acid storage batteries, leads to shorter longevity, which is undesirable both from the point of view of the consumer and the environment.

One limitation of the diode is that it is not controllable in the sense that its switching points are inherent in its design. The prior art contains other arrangements, which replace the diodes of a conventional rectifier or inverter bridge with controllable elements, such as transistors or thyristors.

The voltage regulator, a major part of the charging system, controls the output of the alternator by controlling the excitation current in the field windings. By changing the excitation current in the field windings in the rotor, the strength of the magnetic field of the rotor is affected, and thus the output of the stator windings of the alternator. Prior art voltage regulators typically are preset to maintain the charging voltage of the alternator at a predetermined point, typically between 13 and 15 V. In an automotive charging system, in order for the battery to recharge, the output voltage of the alternator must be higher than that of the battery. However, a large difference can overload the battery, causing electrochemical damage, which decreases its longevity. For this reason, only a small potential difference above the typical 12 to 12.6 V of a fully charged battery is used. Because the rotational speed of the alternator varies with engine speed, the voltage regulator is necessary to maintain the voltage of the alternator output.

A prior art electronic voltage regulator is depicted in FIG. 4. By placing resistances in and out of series with the excitation field current (which is supplied in most cases by the battery), the strength of the excitation field in the rotor can be modified. In this embodiment, if the alternator speed is too low and/or the electrical load too high, the regulator will compensate so that the alternator achieves a preset voltage output. Other systems vary the duty cycle of the field windings in order to arrive at a preset voltage output. During periods of low output, the duty cycle could be as low as 10%.

It should be noted that the prior art rectifier bridge and voltage regulator run as essentially discrete systems, with the voltage regulator determining the alternator output through varying the current through the excitation field winding. Accordingly, the prior art approaches alternator output control exclusively through the field controller. To prevent over-temperature operation of the alternator, a simple solution is to place a thermal breaker in the field controller so that when an over temperature condition is detected, the excitation field winding is turned off, thus discontinuing power generation. When the temperature decreases to an acceptable level, the breaker resets and the alternator begins generating electricity once again. Of course, while the alternator is off line, the battery alone is responsible for providing electricity to the vehicle, which leads to battery discharge.

By allowing repetitive discharge of the battery under periods of high loads, the battery itself is shortened in its longevity. The end result is more dead lead-acid batteries in circulation, which is clearly disadvantageous from system reliability, maintenance cost, and environmental perspectives.

Finally, it should be understood that overall cost is an extremely important criterion in evaluating vehicular design solutions.

SUMMARY OF THE INVENTION

In a preferred embodiment of the present invention, a charging system includes an alternator and a controller for regulating an output voltage of the alternator, wherein the controller includes at least one temperature sensor for sensing a temperature of the alternator and a temperature control device. Further, the temperature control device calculates a slope of temperature variance over time, and the controller regulates the alternator output voltage based on the calculated slope of temperature variance.

In another embodiment, an output of a charging system including an alternator is controlled by first measuring voltage from a single phase of the alternator for determining an alternator output. Next, a required alternator output is determined, and the alternator output is adjusted to be in tolerance with the required output. A temperature of the alternator is then measured, and a slope of temperature variance over time is calculated. Finally, the required output of the alternator is adjusted based on the calculated slope of temperature variance.

According to one feature, the present invention provides a controller for a synchronous rectifier and a field controller that utilizes temperature feedback of the alternator. The combination of these functions into a single smart controller dispenses with the need for separate components. By combining functions into a single smart controller, costs are decreased, manufacturing and diagnostics are rendered simpler, and the overall reliability of the charging system is enhanced.

BRIEF DESCRIPTION OF THE DRAWINGS

These and other features and advantages of the present invention will become more apparent in view of the following detailed description in conjunction with the accompanying drawing, of which.

DETAILED DESCRIPTION OF AN ILLUSTRATIVE EMBODIMENT

The present invention will be described herein with reference to an illustrative embodiment of a temperature feedback controller for a vehicular alternator.

Figure 1:
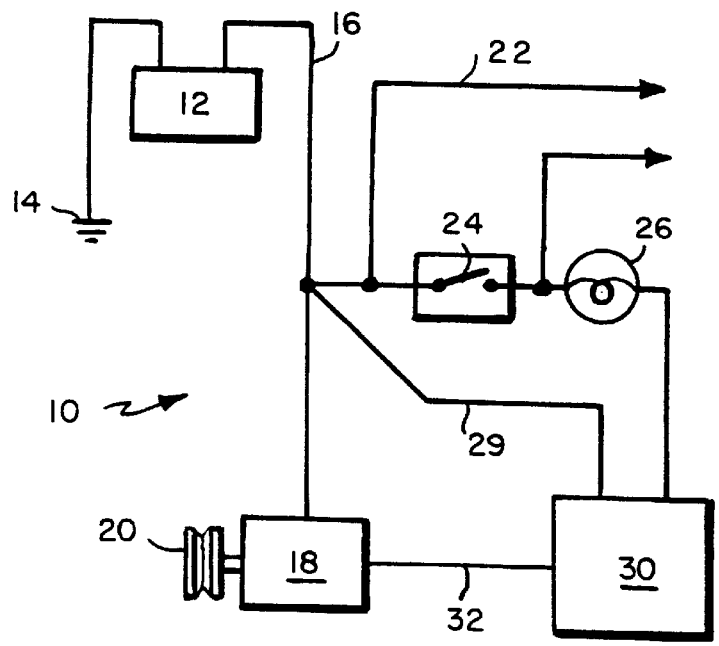
FIG. 1 is a schematic representation of a prior art vehicular charging system.
Figure 2:
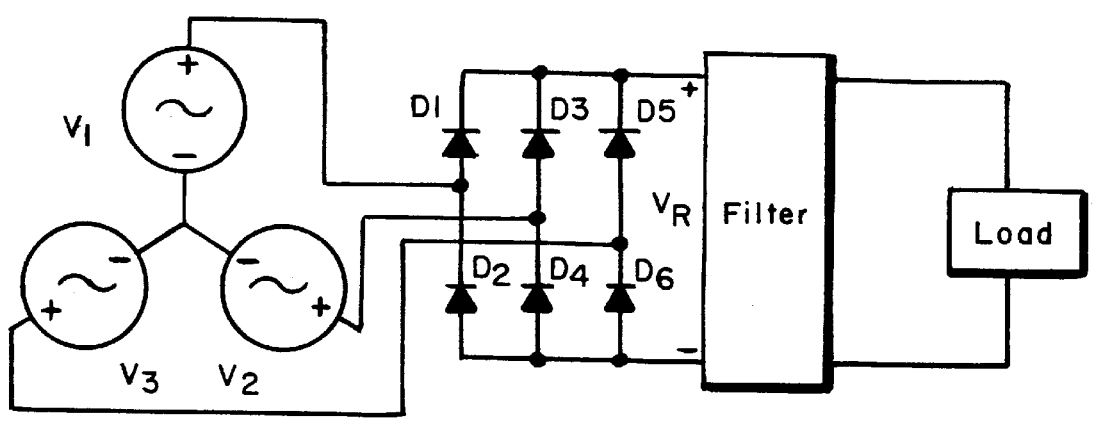
FIG. 2 is a schematic representation of a prior art alternator rectifier bridge.
Figure 3:
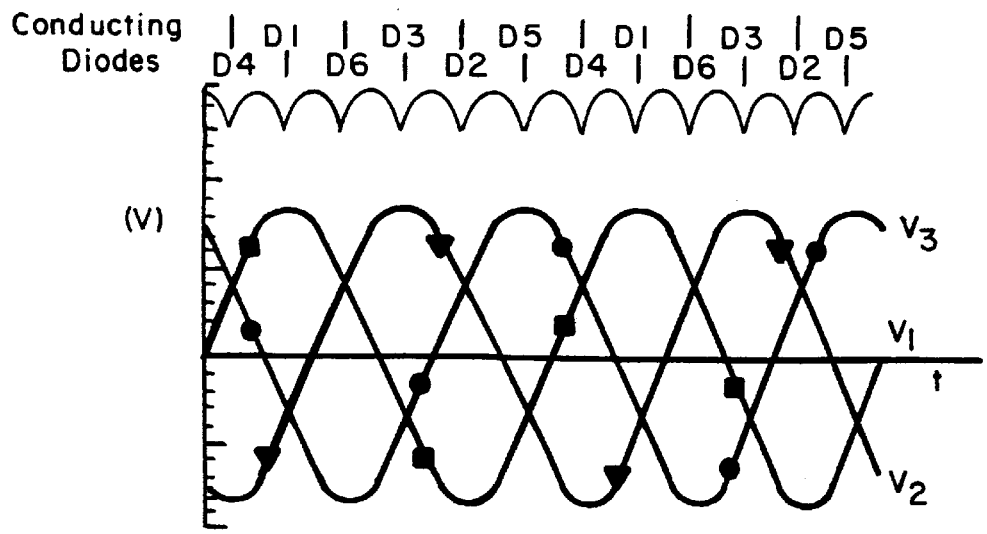
FIG. 3 is a graphical representation of the rectified and unrectified output of an alternator using the bridge of FIG. 2.
Figure 4:
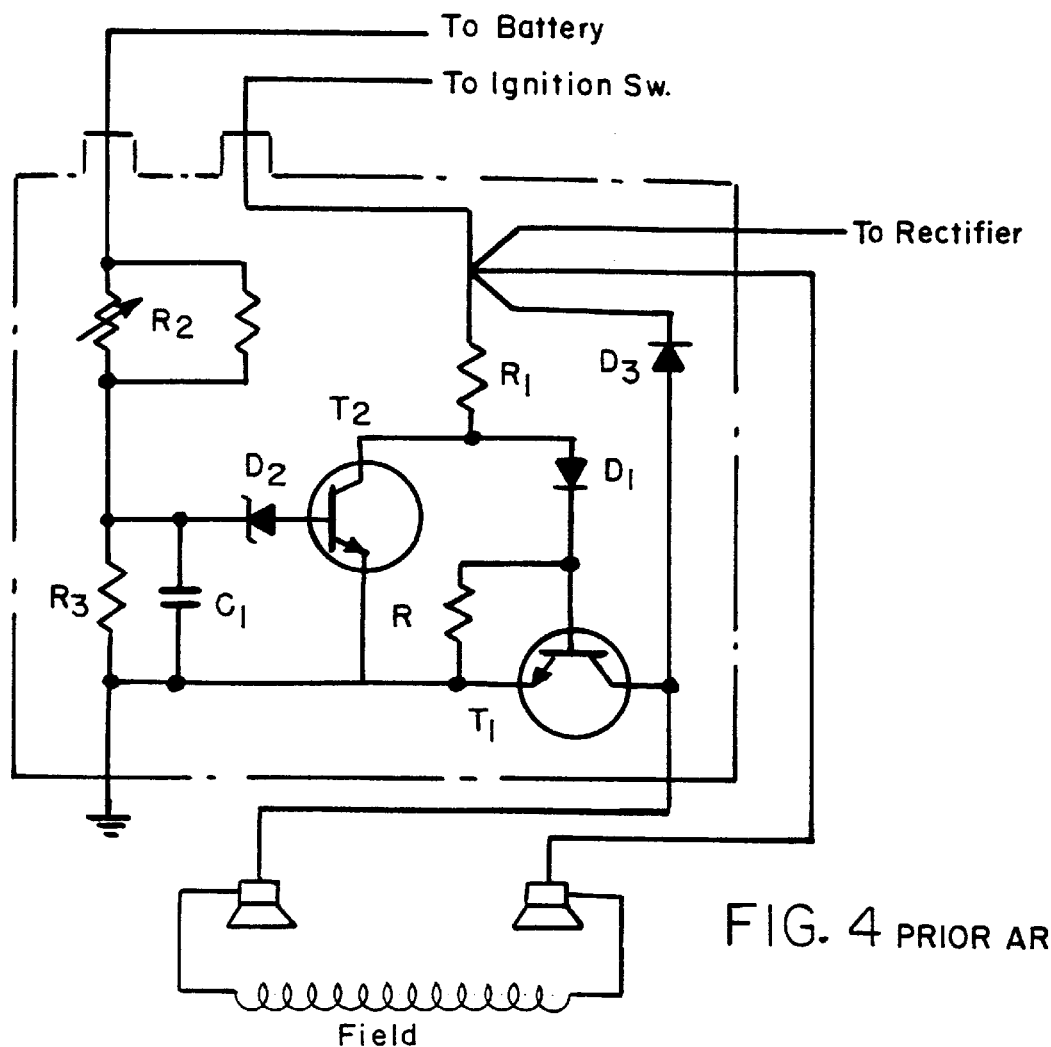
FIG. 4 is a schematic representation of a prior art voltage regulator.
Figure 5:
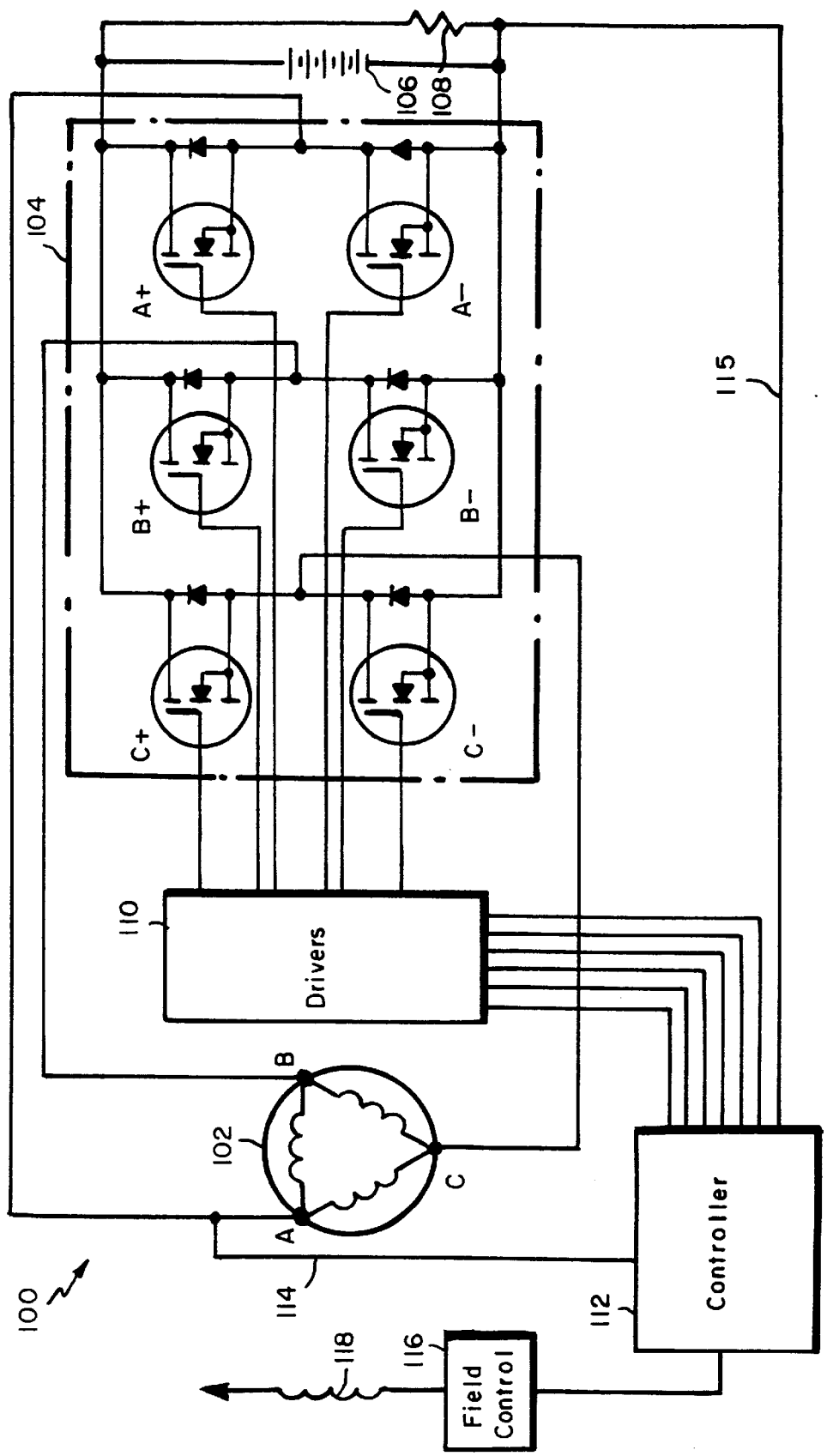
FIG. 5 is a schematic representation of one aspect of the present invention.

The system 100 according to the instant invention is schematically illustrated in FIG. 5. It comprises in relevant part, an alternator having a threephase stator winding 102 with three output connections A, B, and C, and a rotor magnetically coupled thereto as well known. In a preferred embodiment, the rotor is delta configured trapezoidal wound, which produces a third harmonic $V_3$ waveform along with the fundamental, as will be discussed in greater detail below. A full-wave controlled rectifier bridge 104 contains six controlled switches, corresponding to the positive and negative half cycles of each phase, denoted A+, A−, B+, B−, C+, and C−. The power output of the bridge 104 is connected to the battery 106 and the load 108 of the vehicle. Gate drivers 110 control the firing of the controlled switches and are themselves controlled by the controller 112. The controller 112 is responsive to the back EMF through, for example, the measurements of the voltage sensor line 114 and computes the third harmonic $V_3$ to determine the switching points for control the gate drivers 110 of the bridge 104. The controller 112 also determines the phase advance angle $\alpha$, also known as the firing angle, of the six controlled switches, which is defined herein as the angle by which the phase current leads the phase voltage.

The controller 112 also controls the field control circuit 116. By controlling the excitation current provided to the field winding, the output of the alternator can be controlled accordingly. As will be described in greater detail below, the smart controller 112 is able to serve as the voltage regulator in the alternator according to the instant invention. This combination of functions in a single controller dispenses with the need for a separate voltage regulator as required in the prior art, and advantageously provides for cost savings associated therewith.

Figure 6:
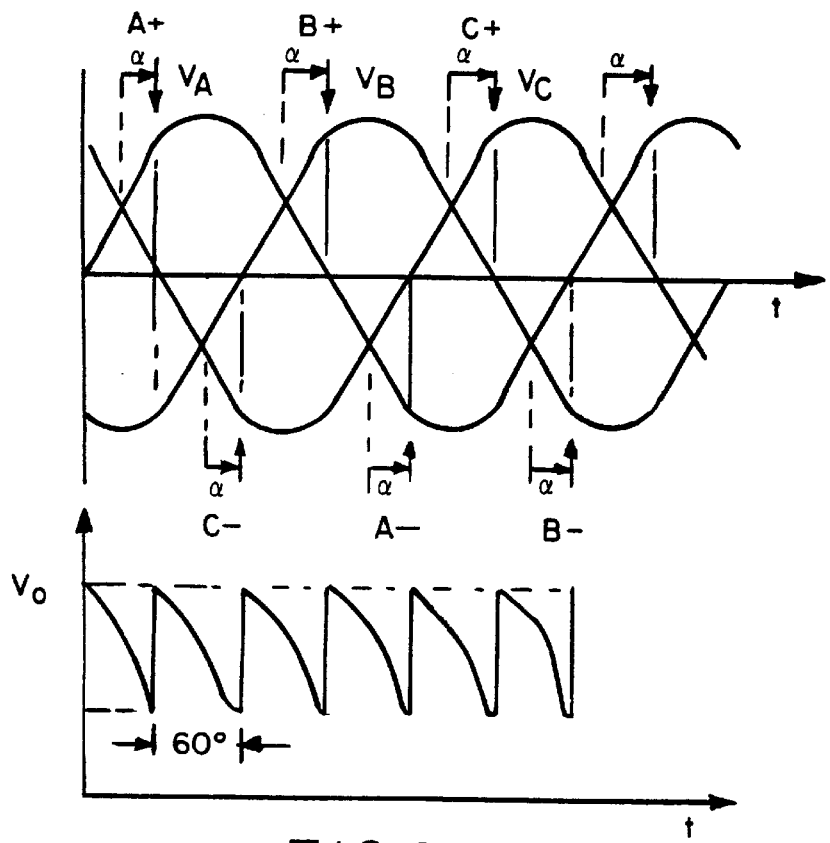
FIG. 6 is a graphical representation of the three-phase output of an alternator showing the six switching points for the synchronous rectifier and the phase advance $\alpha$.

As can be seen in FIG. 6, the controllable switches A+, B+, and C+ are turned on during the positive half cycles of the voltages of the phases to which they are connected and controllable switches A−, B−, and C− are turned on during the negative half cycles of the voltages of the phases. The DC output of the alternator in terms of voltage and current can also be controlled by adjusting the firing angle $\alpha$ with a controlled rectifier bridge.

Figure 7:
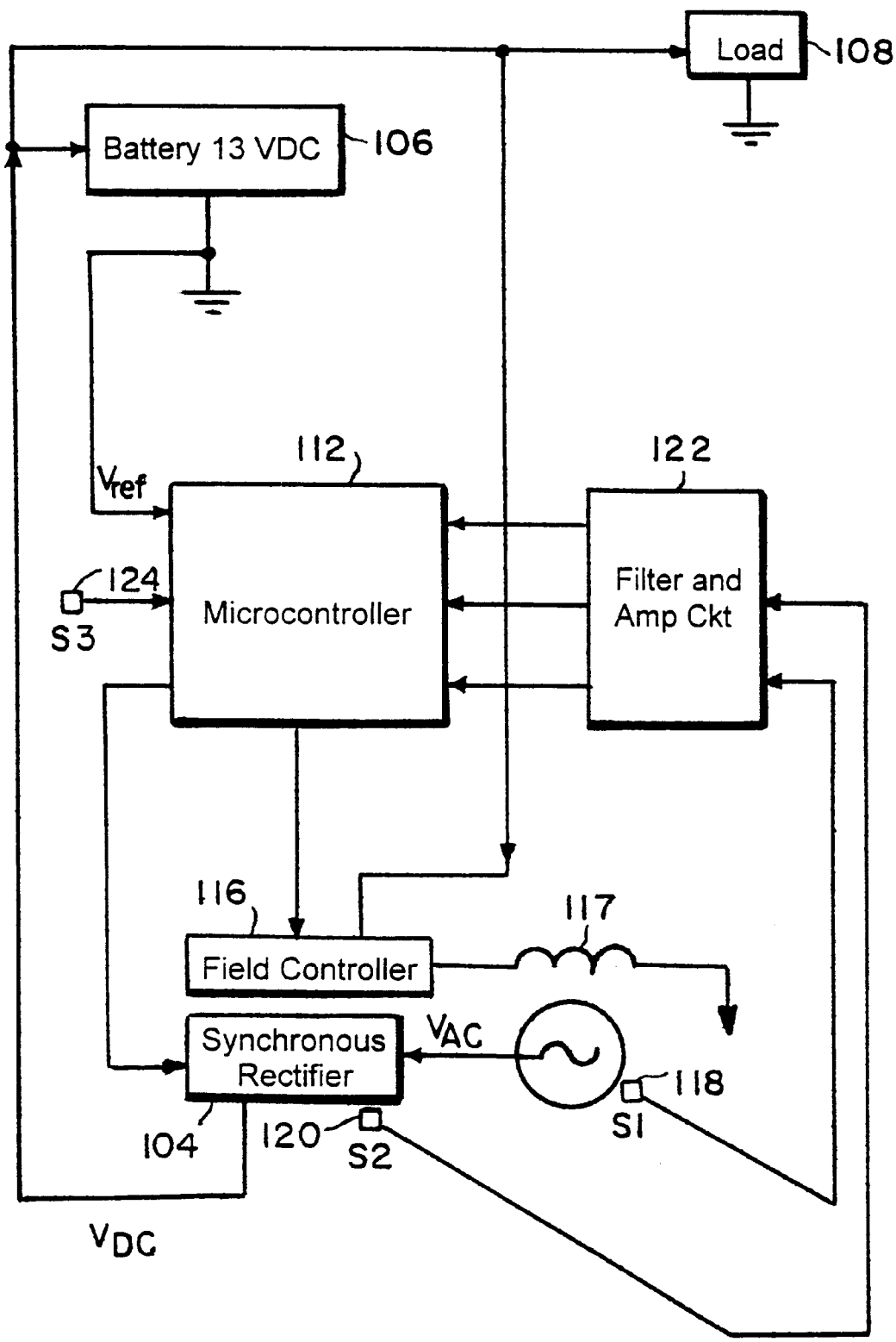
FIG. 7 is a schematic representation of the alternator controller according to one aspect of the invention.

The controller according to the instant invention comprises a smart controller which integrates the functions of excitation field winding control and synchronous rectifier control, while providing for overtemperature protection. As will be described in greater detail herein, this arrangement allows for a scaled, progressive rollback of alternator output during a condition of overtemperature such that optimal output can still be extracted without damaging the rectifier or shortening the life of the battery. FIG. 7 is schematic showing the alternator controller according to an illustrative embodiment of the invention. The intelligent charging system comprises an alternator, which is activated by the prime mover, such as a vehicle engine to produce AC output $V_{AC}$. The alternator is provided with a smart controller 112, which in a preferred embodiment is a PIC16C73A, available commercially from Microchip™. The microprocessor controls the rectification and voltage output of the alternator, and also controls, through instructions to the field controller 116, the excitation current provided to the field winding 117. The AC output is rectified into DC voltage by the bridge 104. Rectified DC voltage is then provided to the battery 106 for recharging the battery and powering the electrical system load 108. Temperature sensors 118 and 120 provide output to a filtering and amplification circuit 122, which in turn provides signals to the microcontroller 112. In the preferred embodiment, temperature of the alternator may be measured at the end turns of the stator by sensor 118 or at the alternator heat sink, or both. Sensor 120 provides signals related to the rectifier heat sinks, or the electronics, or both. A thermal breaker 124 may also be provided to supply a fault condition to the microprocessor, which is processed as an interrupt as discussed below. The sensor array may also include A/D converters as appropriate to the sensor types employed.

Figure 8:
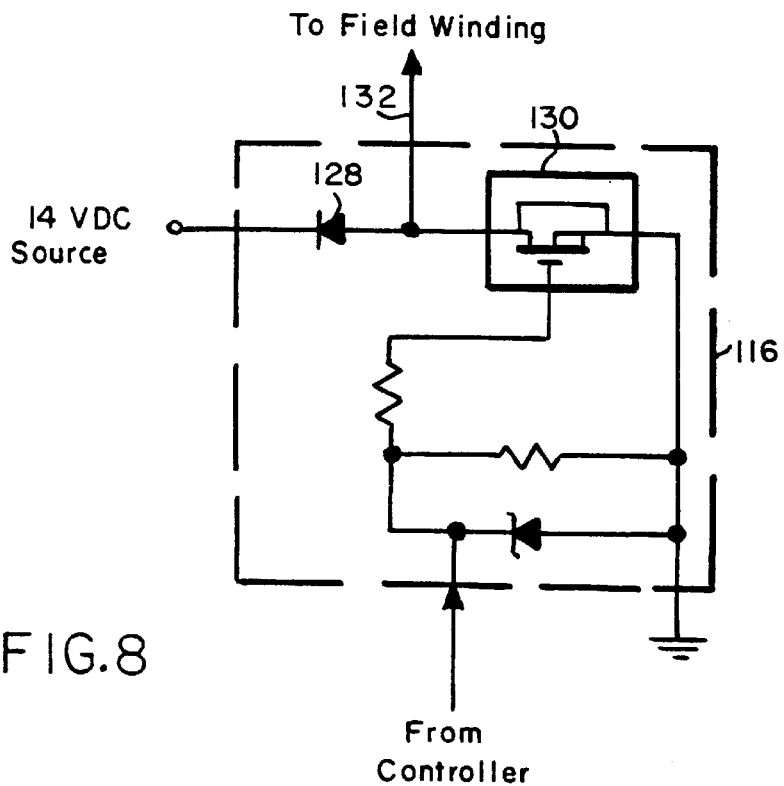
FIG. 8 is a schematic representation of an exemplary field control circuit according to one aspect of the invention.

In operation, the controller 112 is advantageously configured to combine the functions of the synchronous rectifier control and the voltage regulation. This configuration dispenses with the need for a separate voltage regulator required by the prior art alternator. This is possible, for example, through the field control circuit 126 depicted in FIG. 8. A signal lead is passed from the controller 112 to the field controller 126 as mentioned above. Buck control of the field winding is accomplished via diode 128 and FET 130. Excitation to the field winding is provided through output lead 132. The microcontroller 112 may thusly vary the duty cycle of the FET, and concomitantly increase the output of the alternator.

Because the controller 112 also determines the switching points of the synchronous rectifier, as well as any phase advance associated therewith, control of the field excitation duty cycle is particularly advantageous, because power output of the alternator may be controlled across the entire range from zero to maximum through the smart controller. By analyzing the temperature information provided by sensors 118, 120 and 124, the microprocessor is able to contour the alternator output, as is discussed below. By providing the sensors at different locations, more reliable data concerning the temperature of the alternator can be acquired. The microprocessor can also be programmed to vary the overtemperature responses to the data provided, for example, the temperature limit at the stator winding can be different from that at the rectifier heat sinks. The thermal breaker, for example, might be an ambient overtemperature sensor, which might be overrided when the alternator is operating within prescribed temperature limits.

Figure 9:
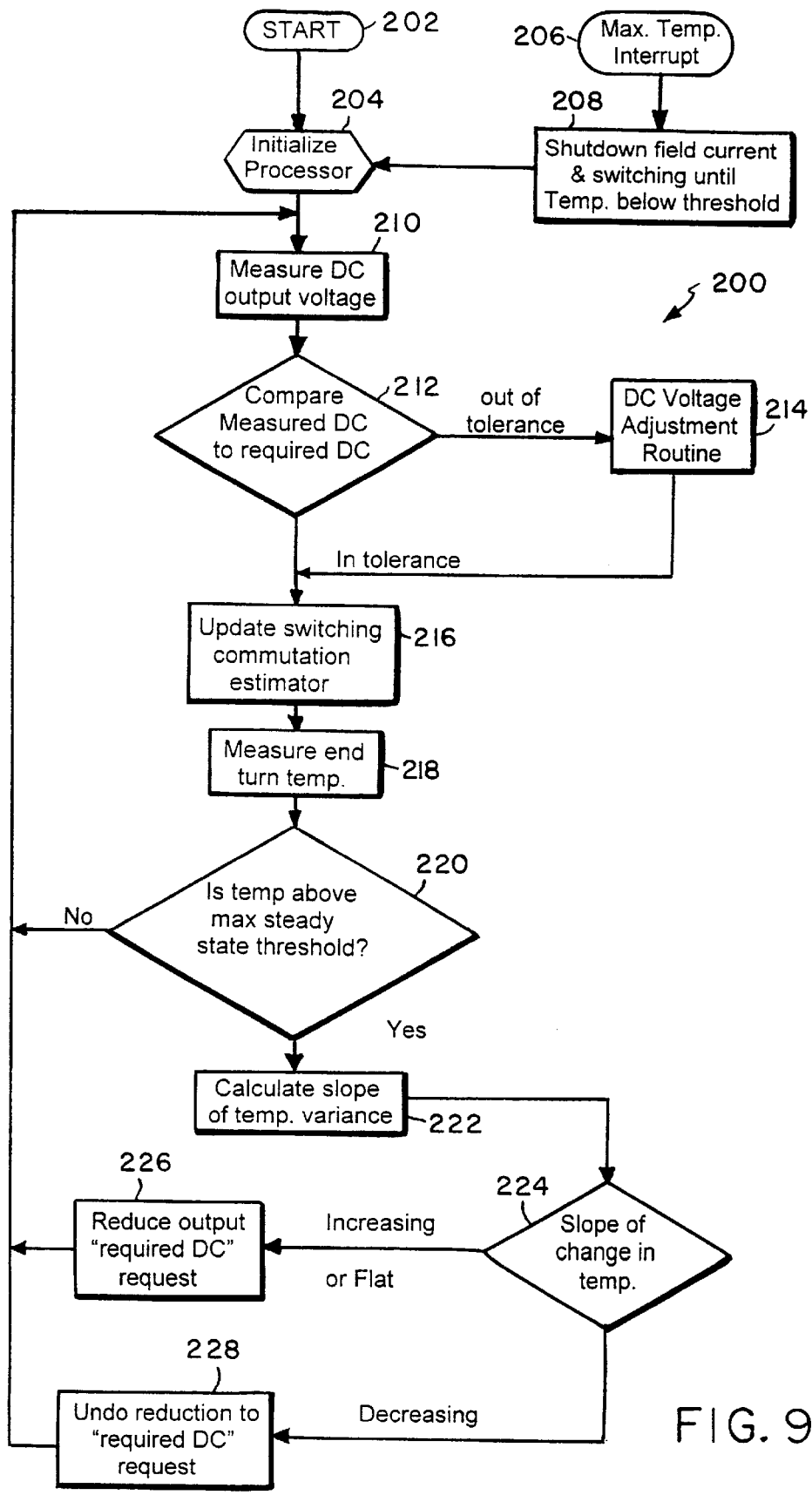
FIG. 9 is a flowchart representation of the operation of the alternator controller according to one aspect of the instant invention.

Operation of the system will be described by reference to flowchart FIG. 9 depicting a flowchart of the exemplary operational method 200. The operation begins at step 202. At step 204 the processor is initialized at startup. At any time during operation, a maximum temperature interrupt may occur at step 206. At step 208, the field current and switching is shut down until the interrupt condition stops, at which time step 204 is executed again to reinitialize the system. At step 210 the DC output voltage of the alternator is measured. This output is compared at step 212 with the required DC output based on the load sensing line connecting to the field controller. This required DC output is the voltage set point used by the controller when it performs the voltage regulation function. If there is an overvoltage or undervoltage condition, the alternator is adjusted at step 214 to bring output into tolerance. This could be achieved through control of the duty cycle of the field, through adjustment of the firing angle of controllable rectifier elements, and the like. Once the output is brought into tolerance with the load, the system updates the switching commutation at step 216. At step 218, the end turn temperature is acquired from sensor 118, as discussed hereinabove. At step 220, the measured end turn temperature is compared to the maximum steady state threshold, which is predetermined. If the measured temperature does not exceed the maximum steady state threshold, operation resumed at step 210. Otherwise, an overtemperature condition is indicated. Note that the maximum temperature interrupt at step 206 may occur at any time, resetting the machine. If the result of step 220 is affirmative, but the maximum temperature has not been achieved, the system then calculates the slope of the temperature variance at step 222. At step 224, this slope is considered. If the slope is flat or increasing, then the alternator will continue in an overtemperature state. Accordingly, at step 226, the system decreases the value of the required DC output, i.e., the voltage set point, by an incremental amount. If, on the other hand, the slope is decreasing, then the overtemperature condition is temporary, and the system will eventually correct itself by decreasing output in step 214. Accordingly, at this point, step 228 removes any modification to the required DC output value, i.e., the voltage set point, made in previous iterations at step 226.

Of course, the steps taken in FIG. 9 are logical examples only, and the exact steps taken, their order and sequence to arrive at the same result may be varied.

All of the temperature sensors 118, 120 and 124 may be thermal breakers, as these are reliable and less expensive than other elements. The temperature sensors may also be other elements, however, such as thermistors, thermocouples, or PN junctions exhibiting a voltage drop with temperature change.

Further, although the present invention is described with reference to certain components, such as a microcontroller, a field controller FET, and the like, it should be understood that other components might of course be substituted. For instance, the FET in the field controller can be another type of semiconductor switch device, such as a transistor, and the controller might be a digital signal processor or other type of microprocessor.

Although the invention has been shown and described with respect to exemplary embodiments thereof, various other changes, additions and omissions in the form and detail thereof may be made therein without departing from the spirit and scope of the invention.

What is claimed is:

1. A charging system comprising an alternator, and a controller for regulating an output voltage of the alternator, the controller comprising at least one temperature sensor for sensing a temperature of the alternator and a temperature control device, wherein said temperature control device calculates a slope of temperature variance over time, and said controller regulates the alternator output voltage based on the calculated slope of temperature variance.

2. The charging system of claim 1, wherein said controller regulates the alternator output voltage in accordance with a voltage set point value, and wherein said temperature control device decreases the voltage set point value when the calculated slope of temperature variance indicates a state of over-temperature.

3. The charging system of claim 2, wherein the temperature control device further comprises a reset device for resetting the voltage set point value when the calculated slope of temperature variance is decreasing.

4. A method for controlling the output of a charging system comprising an alternator comprising the steps of:

(a) measuring voltage from a single phase of the alternator for determining an alternator output;

(b) determining a required output of the alternator;

(c) adjusting the output of the alternator to be in tolerance with the required output;

(d) measuring a temperature of the alternator;

(e) calculating a slope of temperature variance over time; and (f) adjusting the required output of the alternator output based on the calculated slope of temperature variance.

5. The method of claim 4, wherein the step of adjusting the output of the alternator further comprises the steps of:

(g) determining if the slope calculated in step (e) is decreasing; and (h) reducing the required output of the alternator when the slope calculated in step (e) is other than decreasing.

6. The method of claim 5, further comprising the steps of:

(i) reversing any previous reduction of the required output of the alternator from step (h) when the slope calculated in step (e) is decreasing.

* * * * *